United States Patent
Pediaditaki et al.

(10) Patent No.: US 10,437,590 B2
(45) Date of Patent: Oct. 8, 2019

(54) INTER-CLUSTER COMMUNICATION OF LIVE-IN REGISTER VALUES

(71) Applicant: Intel Corporation, Santa Clara, CA (US)

(72) Inventors: Sofia Pediaditaki, San Jose, CA (US); Ethan Schuchman, Santa Clara, CA (US); Rangeen Basu Roy Chowdhury, Santa Clara, CA (US); Manjunath Shevgoor, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 44 days.

(21) Appl. No.: 15/719,290

(22) Filed: Sep. 28, 2017

(65) Prior Publication Data

US 2019/0095203 A1     Mar. 28, 2019

(51) Int. Cl.
| | | |
|---|---|---|
| G06F 12/00 | (2006.01) | |
| G06F 9/30 | (2018.01) | |
| G06F 12/0846 | (2016.01) | |
| G06F 12/128 | (2016.01) | |
| G06F 9/52 | (2006.01) | |
| G06F 12/0811 | (2016.01) | |

(52) U.S. Cl.
CPC ........ G06F 9/3004 (2013.01); G06F 9/30036 (2013.01); G06F 9/524 (2013.01); G06F 12/0811 (2013.01); G06F 12/0848 (2013.01); G06F 12/128 (2013.01); G06F 2212/282 (2013.01); G06F 2212/283 (2013.01); G06F 2212/621 (2013.01)

(58) Field of Classification Search
CPC .... G06F 9/3004; G06F 9/30036; G06F 9/524; G06F 12/0848; G06F 12/128; G06F 12/0811; G06F 2212/621; G06F 2212/282; G06F 2212/283
See application file for complete search history.

(56) References Cited

U.S. PATENT DOCUMENTS

| | | | |
|---|---|---|---|
| 6,282,585 B1 | 8/2001 | Batten et al. | |
| 6,463,507 B1* | 10/2002 | Arimilli | G06F 12/0811 711/122 |
| 2003/0204504 A1 | 10/2003 | Stuy et al. | |
| 2005/0039167 A1 | 2/2005 | Fernandes et al. | |
| 2007/0157008 A1 | 7/2007 | Sodani et al. | |
| 2008/0133883 A1 | 6/2008 | Glew et al. | |
| 2010/0241813 A1* | 9/2010 | Shen | G06F 9/52 711/144 |

OTHER PUBLICATIONS

International Search Report and Written Opinion for Application No. PCT/US2018/048332, dated Dec. 11, 2018, 12 pages.

* cited by examiner

*Primary Examiner* — Kalpit Parikh
(74) *Attorney, Agent, or Firm* — Nicholson De Vos Webster & Elliott LLP (57) ABSTRACT

Embodiments of apparatuses, methods, and systems for inter-cluster communication of live-in register values are described. In an embodiment, a processor includes a plurality of execution clusters. The processor also includes a cache memory in which to store a value to be produced by a first execution cluster of the plurality of execution clusters and consumed by a second execution cluster of the plurality of execution clusters. The cache memory is separate from a system memory hierarchy and a register set of the processor.

15 Claims, 9 Drawing Sheets

INTER-CLUSTER COMMUNICATION OF LIVE-IN REGISTER VALUES

FIELD OF INVENTION

The field of invention relates generally to computer architecture.

BACKGROUND

A processor in a computer or other information processing system may be implemented with a clustered microarchitecture in which the resources used in one or more stages of a pipeline are partitioned into separate clusters. In such a microarchitecture, execution of an instruction by one cluster may depend on a register value to be produced by another instruction to be executed by another cluster. In this situation, the former instruction may be referred to as a consumer, the latter instruction may be referred to as a producer, and the register value may be referred to as a live-in register value because it will be in use, or live, in the processor and affect the result of subsequent operations (arithmetic and memory). In contrast, a dead register value does not influence any subsequent operations. Communication between and among clusters, such as the communication of a live-in register value from a producer in one cluster to a consumer in a different cluster, may be referred to as inter-cluster communication.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

Embodiments of the present invention provide techniques for inter-cluster communication of live-in register values. The use of embodiments may be desirable to reduce inter-cluster communication latency and/or preferable, based on complexity, power, and/or performance, to other inter-cluster communication techniques, such as renaming of registers, broadcasting of producer values, and inserting of register copy operations. The use of embodiments may provide for smaller physical register file size and lower complexity register renaming.

Figure 1:
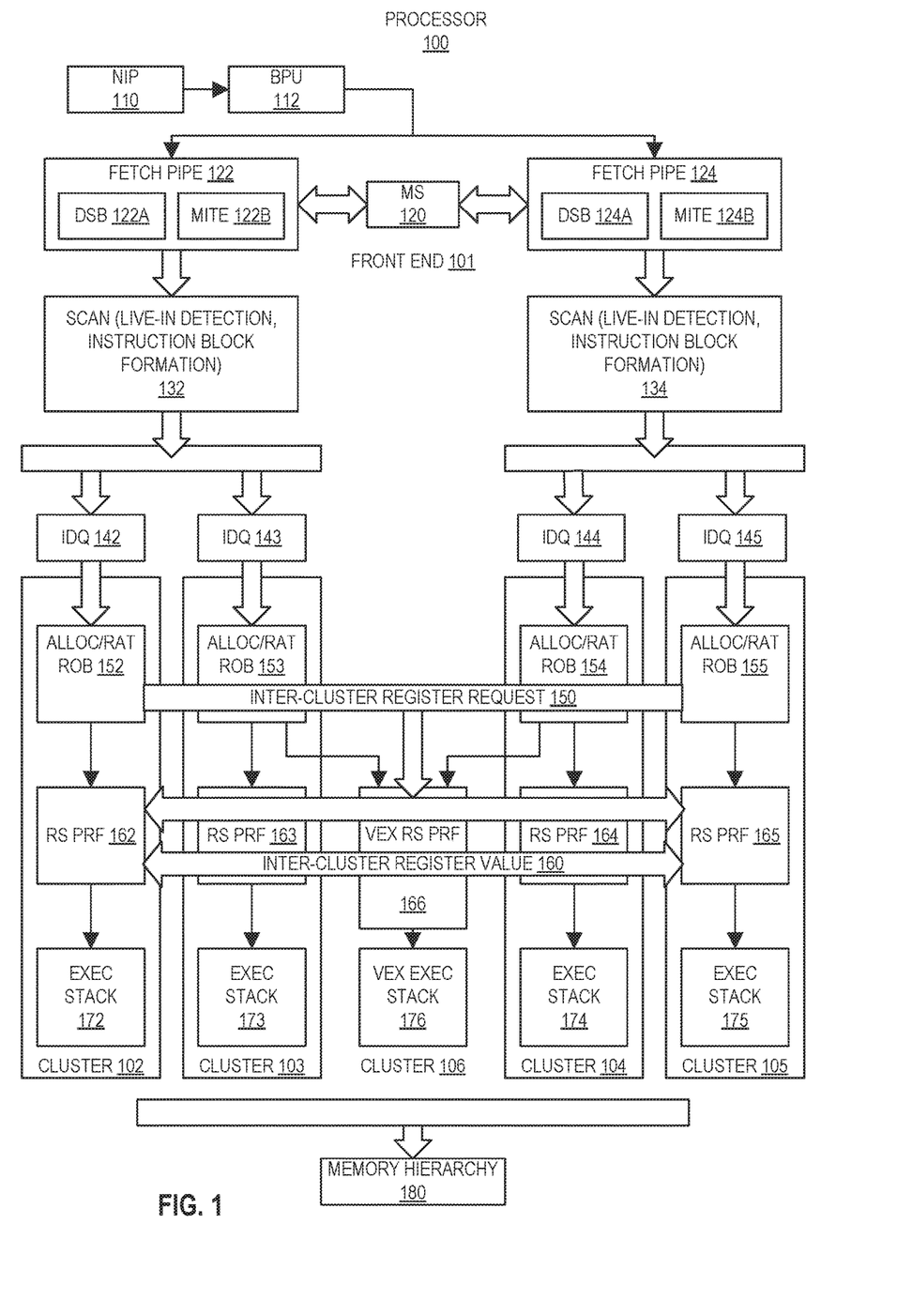
FIG. 1 is a block diagram illustrating a processor having a clustered microarchitecture.

FIG. 1 is a block diagram illustrating a processor 100 having a clustered microarchitecture including a front end 101 and execution clusters 102, 103, 104, 105, and 106. Each of execution clusters 102, 103, 104, and 105 may be configured to execute integer instructions, and execution cluster 106 may be configured to execute floating point and/or vector (VEX) instructions. Processor 100, as shown in FIG. 1, depicts one possible configuration of a clustered microarchitecture having four clusters. Many other configurations of a clustered microarchitecture, having any number of clusters and any number of elements within each cluster, are possible. A live-in cache according to an embodiment of the invention may be included in any of these various clustered microarchitectures.

Front end 101 includes next instruction pointer (NIP) 110, which is coupled to branch prediction unit (BPU) 112, which is coupled to fetch pipe 122 and fetch pipe 124. Fetch pipe 122 includes decoded stream buffer (DSB) 122A and micro instruction translation engine (MITE) 122B, fetch pipe 124 includes DSB 124A and MITE 124B, and both fetch pipe 122 and fetch pipe 124 are coupled to micro sequencer (MS) 120. Fetch pipe 122 is also coupled to scan unit 132 for live-in detection and instruction block formation for instructions from fetch pipe 122, and fetch pipe 124 is also coupled to scan unit 134 for live-in detection and instruction block formation for instructions from fetch pipe 124. Scan unit 122 is coupled to instruction decode queue (IDQ) 142 and IDQ 143, and scan unit 124 is coupled to IDQ 144 and IDQ 145.

Front end 101 may fetch, scan, and decode instructions, and generate as an output one or more micro-operations, micro-code entry points, microinstructions, other instructions, or other control signals, which are decoded from, or which otherwise reflect, or are derived from, the original instructions. The decoding may be implemented using various different mechanisms. Examples of suitable mechanisms include, but are not limited to, look-up tables, hardware implementations, programmable logic arrays (PLAs), microcode read only memories (ROMs), etc.

IDQs 142, 143, 144, and 145 are coupled to allocators 152, 153, 154, and 155, respectively, each of which may include a register alias table (RAT) and/or a re-order buffer (ROB). Allocator 152 is coupled to reservation station (RS)/physical register file (PRF) 162, allocator 153 is coupled to RS/PRF 163 and VEX RS/PRF 166, allocator 154 is coupled to RS/PRF 164 and VEX RS/PRF 166, and allocator 155 is coupled to RS/PRF 165. RS/PRF 162 is coupled to execution stack 172, RS/PRF 163 is coupled to execution stack 173, RS/PRF 164 is coupled to execution stack 174, RS/PRF 165 is coupled to execution stack 175, and VEX RS/PRF 166 is coupled to execution stack 176. Each of execution stacks 172, 173, 174, 175, and 176 are coupled to memory hierarchy 180, which may include one or more levels of cache memory on the same chip as processor 100.

In processor 100, a known approach to Inter-cluster communication of live-in register values may include an allocator 152, 153, 154, or 155 making an inter-cluster register request 150 which is fulfilled by transfer of an inter-cluster register value 160 from an RS/PRF 162, 163, 164, 165, or 166 to another of RS/PRF 162, 163, 164, 165, or 166. According to this approach, a physical register file entry in a cluster is allocated for a live-in value produced in a different cluster.

Figure 2:
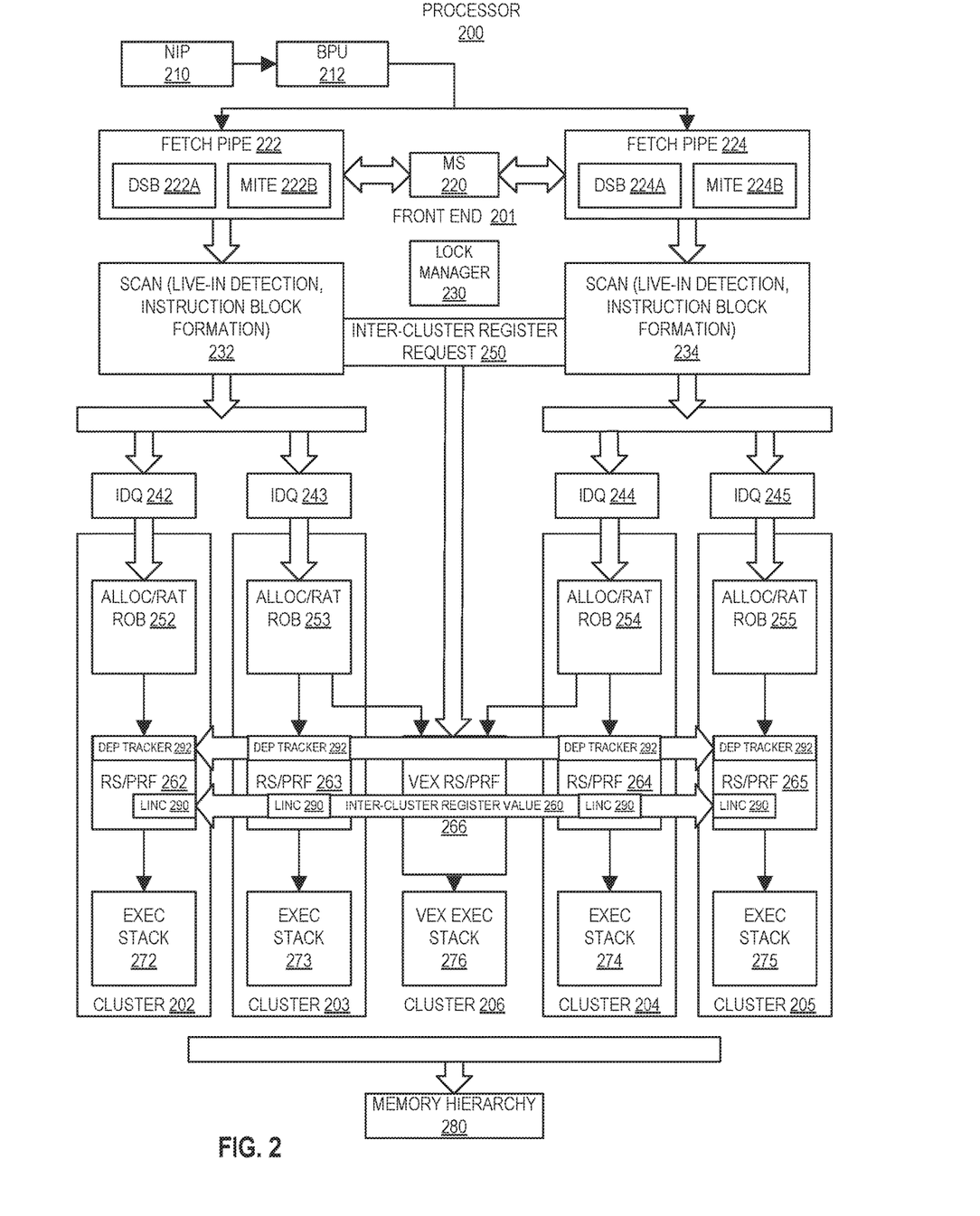
FIG. 2 is a block diagram illustrating a processor having a clustered microarchitecture and a live-in cache according to an embodiment of the invention.
Figure 3:
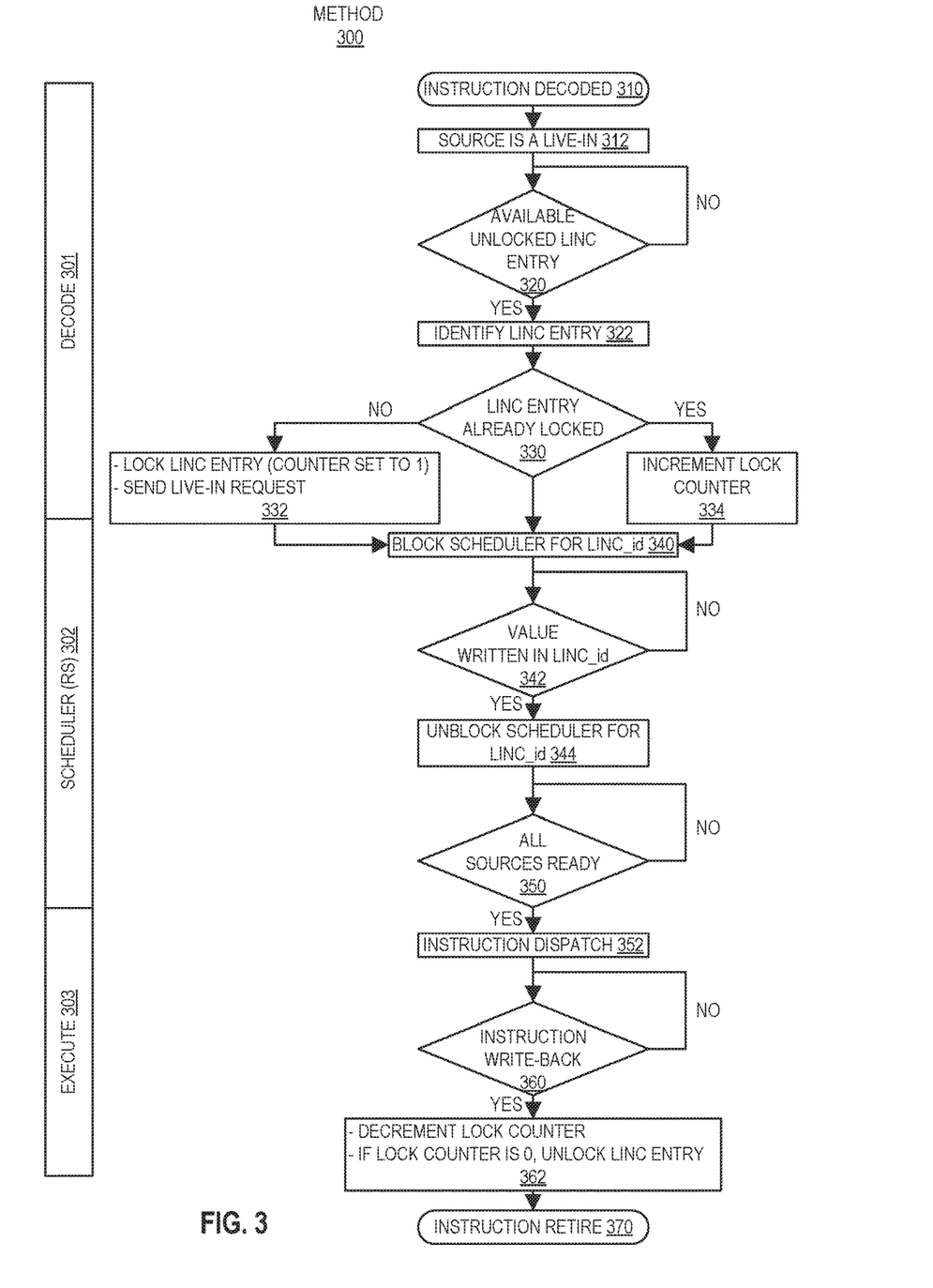
FIG. 3 is a flow diagram illustrating a method for using a live-in cache according to an embodiment of the invention.

FIG. 2 is a block diagram illustrating a processor 200 having a clustered microarchitecture and a live-in cache according to an embodiment of the invention. FIG. 3 is a flow diagram illustrating a method 300 for using a live-in cache, such as that shown in FIG. 2, according to an embodiment of the invention. FIGS. 4 to 9, each as described below, also illustrate processors and systems including embodiments of the invention, in which processors 490, 500, 610, 615, 770, 780, and 910 and systems 600, 700, 800, and 900 may include any or all of the blocks and/or elements shown in processor 200 of FIG. 1, which may operate according to the techniques and/or method described in the descriptions of FIGS. 2 and 3.

Processor 200 may represent all or part of a hardware component including one or more processors integrated on a single substrate or packaged within a single package, each of which may include multiple execution threads and/or multiple execution cores, in any combination. Each processor represented as or in processor 200 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 200 and/or any core within processor 200 may be architected and designed to operate according to any instruction set architecture.

In FIG. 2, processor 200 has a clustered microarchitecture including a front end 201 and execution clusters 202, 203, 204, 205, and 206. Processor 200, as shown in FIG. 2, depicts one possible configuration of a clustered microarchitecture. Many other configurations of a clustered microarchitecture, having any number of clusters and any number of elements within each cluster, are possible. A live-in cache according to an embodiment of the invention may be included in any of these various clustered microarchitectures.

Front end 201 includes NIP 210, which is coupled to BPU 212, which is coupled to fetch pipe 222 and fetch pipe 224. Fetch pipe 222 includes DSB 222A and MITE 222B, fetch pipe 224 includes DSB 224A and MITE 224B, and both fetch pipe 222 and fetch pipe 224 are coupled to MS 220. Fetch pipe 222 is also coupled to scan unit 232 for live-in detection and instruction block formation for instructions from fetch pipe 222, and fetch pipe 224 is also coupled to scan unit 234 for live-in detection and instruction block formation for instructions from fetch pipe 224. Scan unit 222 is coupled to IDQ 242 and IDQ 243, and scan unit 224 is coupled to IDQ 244 and IDQ 245.

Front end 201 may fetch, scan, and decode instructions, and generate as an output one or more micro-operations, micro-code entry points, microinstructions, other instructions, or other control signals, which are decoded from, or which otherwise reflect, or are derived from, the original instructions. The decoding may be implemented using various different mechanisms. Examples of suitable mechanisms include, but are not limited to, look-up tables, hardware implementations, programmable logic arrays (PLAs), microcode read only memories (ROMs), etc.

IDQs 242, 243, 244, and 245 are coupled to allocators 252, 253, 254, and 255, respectively, each of which may include a RAT and/or a ROB. Allocator 252 is coupled to RS/PRF 162, allocator 253 is coupled to RS/PRF 263 and VEX RS/PRF 266, allocator 254 is coupled to RS/PRF 264 and VEX RS/PRF 266, and allocator 255 is coupled to RS/PRF 265. RS/PRF 262 is coupled to execution stack 272, RS/PRF 263 is coupled to execution stack 273, RS/PRF 264 is coupled to execution stack 274, RS/PRF 265 is coupled to execution stack 275, and VEX RS/PRF 266 is coupled to execution stack 276. Each of execution stacks 272, 273, 274, 275, and 276 are coupled to memory hierarchy 280, which may include one or more levels of cache memory on the same chip as processor 200.

In processor 200, a novel approach to Inter-cluster communication of live-in register values according to an embodiment of the invention may include a scan unit 222 or 224 making an inter-cluster register request 250 which is fulfilled by an execution stack 272, 273, 273, 274, or 275 reading a live-in value from live-in cache (LINC) 290.

LINC 290 may be any type of cache memory that provides a separate namespace (e.g., a container for register values that is distinct from and may be addressed and accessed independently from the physical register file and/or various levels of system memory) in which to store live-in register values. Each LINC entry also stores a ready bit (or other indicator) to indicate that the live-in register value has been produced and stored in LINC 290. Ready bits may be used as described below. One or more storage structures for the live-in register values and the ready bits may be physically located in the execution unit of the processor.

Each LINC may also include and/or have associated with it a corresponding entry in which to store a live-in identification (ID) value and one or more semaphore (or other indicator) bits for locking the entry. The live-in ID value may be a unique value formed from a combination of an identifier of the instruction block that produced the live-in register value and an identifier of the logical register in which the live-in register value is or was to be stored (in other words, the live-in register). One or more storage structures for the live-in register values and the ready bits may be physically located in the front end unit of the processor: for example, the lock bits may be physically located in lock manager 230 to provide for locking LINC entries during the decode phase of the processor pipeline.

Live-in values stored in LINC 290 may be locked by lock manager 230 to avoid premature eviction (before being used by a consumer). As soon as the producer cluster of a live-in value is known (after decode and cluster allocation stage), the consumer instruction finds a LINC entry (if one exists) and locks it. The lock counter is incremented on inter-cluster register requests and decremented when corresponding consumer instructions are executed. When a lock bit become zero, its LINC entry is unlocked and is free to be replaced according to a replacement policy (for example, least recently used). As an optimization, inter-cluster requests are sent only if a LINC entry for the required live-in register has not been allocated in the cache. If a LINC entry for a live-in register has already been allocated by a previous instruction, the lock counter is incremented but a request is not sent. Since the lock is established at decode (speculatively), the lock counters are reset in response to a pipeline flush. A pipeline flush also flushes the LINC to maintain consistency of register values.

Upon locking a LINC entry, an instruction carries with it a LINC_ID, and its execution is blocked until the live-in value is received. When the live-in value is received, data is written in the cache entry locked for the request and the LINC_ID is used to unblock all consumers waiting for the incoming value. Each instruction which reads the value and executes decreases the lock counter of the LINC entry it depends on. The locking mechanism guarantees that a valid LINC entry will not be evicted until all consumer instructions of that entry have read the value from the cache.

Dependency tracker 292 tracks dependencies of instructions on live-in values and wakes up instructions when their live-in values have been produced and are ready in the live-in cache. Dependency tracker 292 may be implemented with extra entries in the out-of-order scheduler to track dependencies on values stored in the LINC, leveraging an existing instruction unblocking mechanism by simply extending the scheduler matrix. Therefore, it does not add extra hardware for tracking instruction dependencies.

FIG. 3 is a flow diagram illustrating a method 300 for using a live-in cache according to an embodiment of the invention. For purposes of illustration, the description of method 300 may refer to elements of processor 200; however, method embodiments of the invention are not limited to these illustrative details.

In block 310 of method 300, an instruction is decoded. In block 312, it is determined that a source value for the instruction is a live-in value. In block 320, it is determined whether there is an available, unlocked entry in the LINC. If not, then method 300 stays in block 320 until an unlocked LINC entry becomes available. If so, then method 300 continues in block 322.

In block 322, a LINC entry is identified. In block 330, it is determined whether the identified LINC entry is already locked. If so, the lock counter is incremented in block 334 and method 300 continues in block 340. If not, then, in block 332, the LINC entry is locked (for example, by setting the lock counter) and a live-in request is sent, then method 300 continues in block 340.

Each of blocks 310 to 334 may be performed during an instruction decode stage 301 of a processor pipeline.

In block 340, the instruction scheduler is blocked from scheduling the consumer instruction corresponding to the LINC_ID. In block 342, it is determined (for example, based on the ready bit corresponding to the LINC_ID) whether the source value has been produced and stored in the LINC entry corresponding to the LINC_ID. If not, then method 300 stays in block 342 until a LINC entry until the source value has been produced and stored in the LINC entry corresponding to the LINC_ID. If so, then method 300 continues in block 344.

In block 344, the instruction scheduler is unblocked from scheduling the consumer instruction corresponding to the LINC_ID. In block 350, it is determined whether all other source values for the instruction are ready. If not, then method 300 stays in block 350 until all other source values for the instruction are ready. If so, then method 300 continues in block 352.

Each of blocks 340 to 350 may be performed during an instruction scheduling stage 302 of a processor pipeline.

In block 352, the instruction is dispatched. In block 360, it is determined whether execution of the instruction is ready for write-back. If not, then method 300 stays in block 360 until execution of the instruction is ready for write-back. If so, then method 300 continues in block 362. In block 362, the lock counter is decremented, and, if decrementing the lock counter results in the lock counter equaling zero, the LINC entry is unlocked.

Each of blocks 352 to 362 may be performed during an instruction execution stage 303 of a processor pipeline.

In block 370, the instruction is retired.

Therefore, embodiments of the invention allow an inter-cluster register request to be made earlier in the pipeline (as soon as the consumer instruction has been decoded and instruction blocks have been formed such that information about the producing cluster of its sources is known, instead of after register renaming and allocation) since the instruction does not need to wait for logical-to-physical register renaming. In an embodiment, live-in sources may be predicted before decode.

Also, since inter-cluster live-in source registers are not allocated in the physical register file, the physical register file does not increase in size and no extra hardware is added to the renamer to handle additional physical registers. Therefore, a LINC according to an embodiment of the invention may be desired because without it, extra physical registers may be needed to allocate live-in sources without increasing the register pressure, which complicates renamer hardware since the renamer has to handle more physical registers.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

Figure 4A:
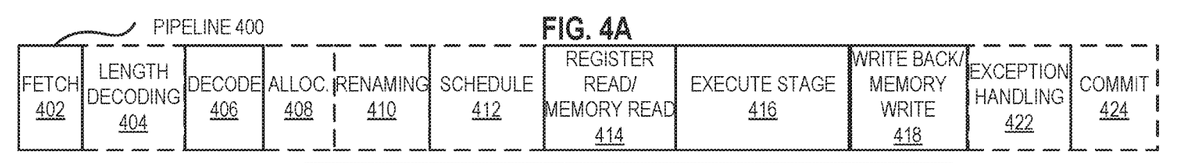
FIG. 4A is a block diagram illustrating both an exemplary in-order pipeline and an exemplary register renaming, out-of-order issue/execution pipeline according to embodiments of the invention.
Figure 4B:
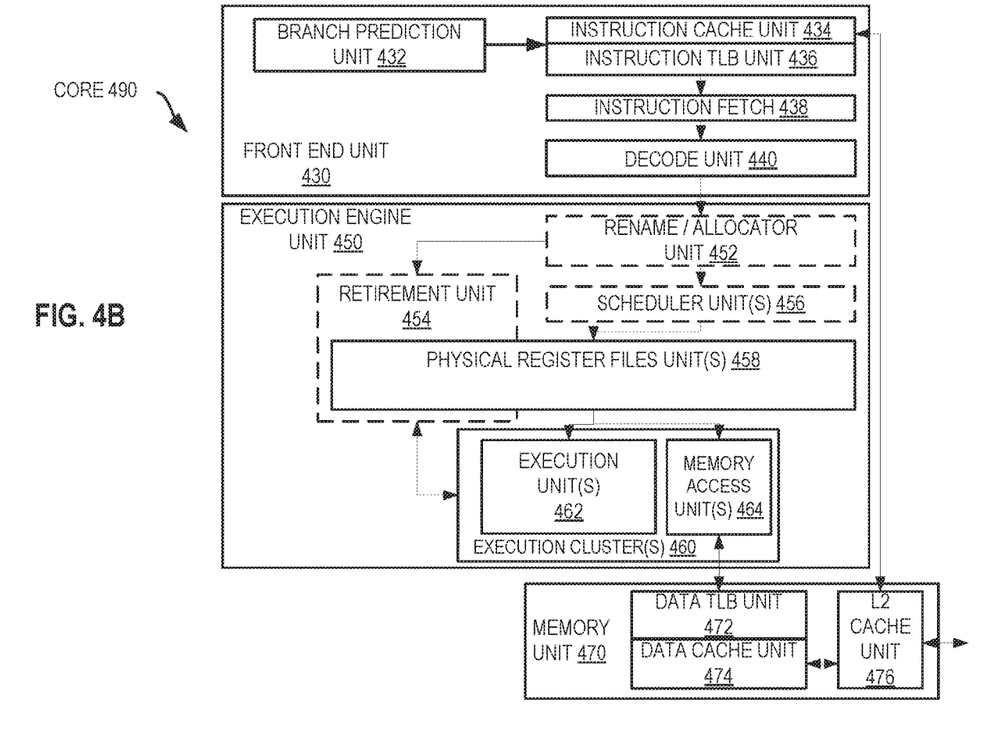
FIG. 4B is a block diagram illustrating both an exemplary embodiment of an in-order architecture core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
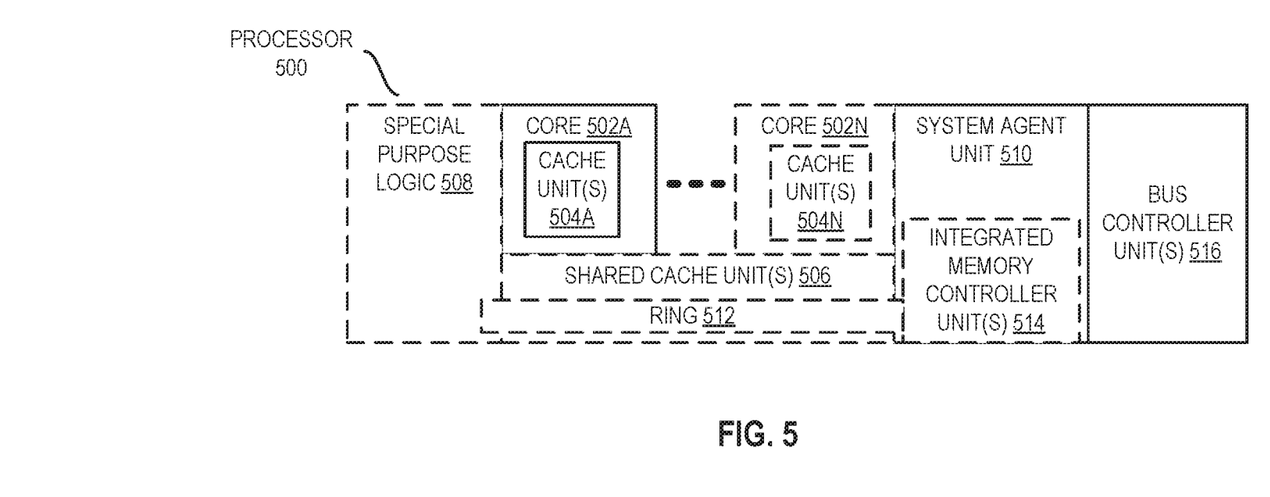
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multithreading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
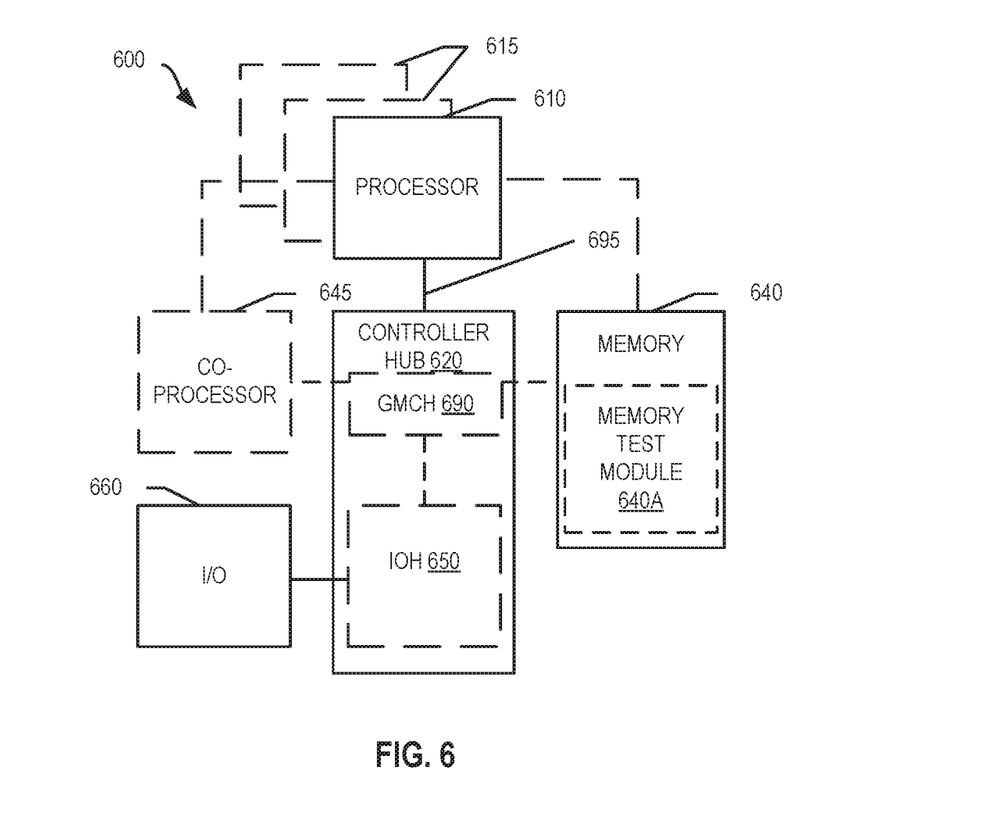
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
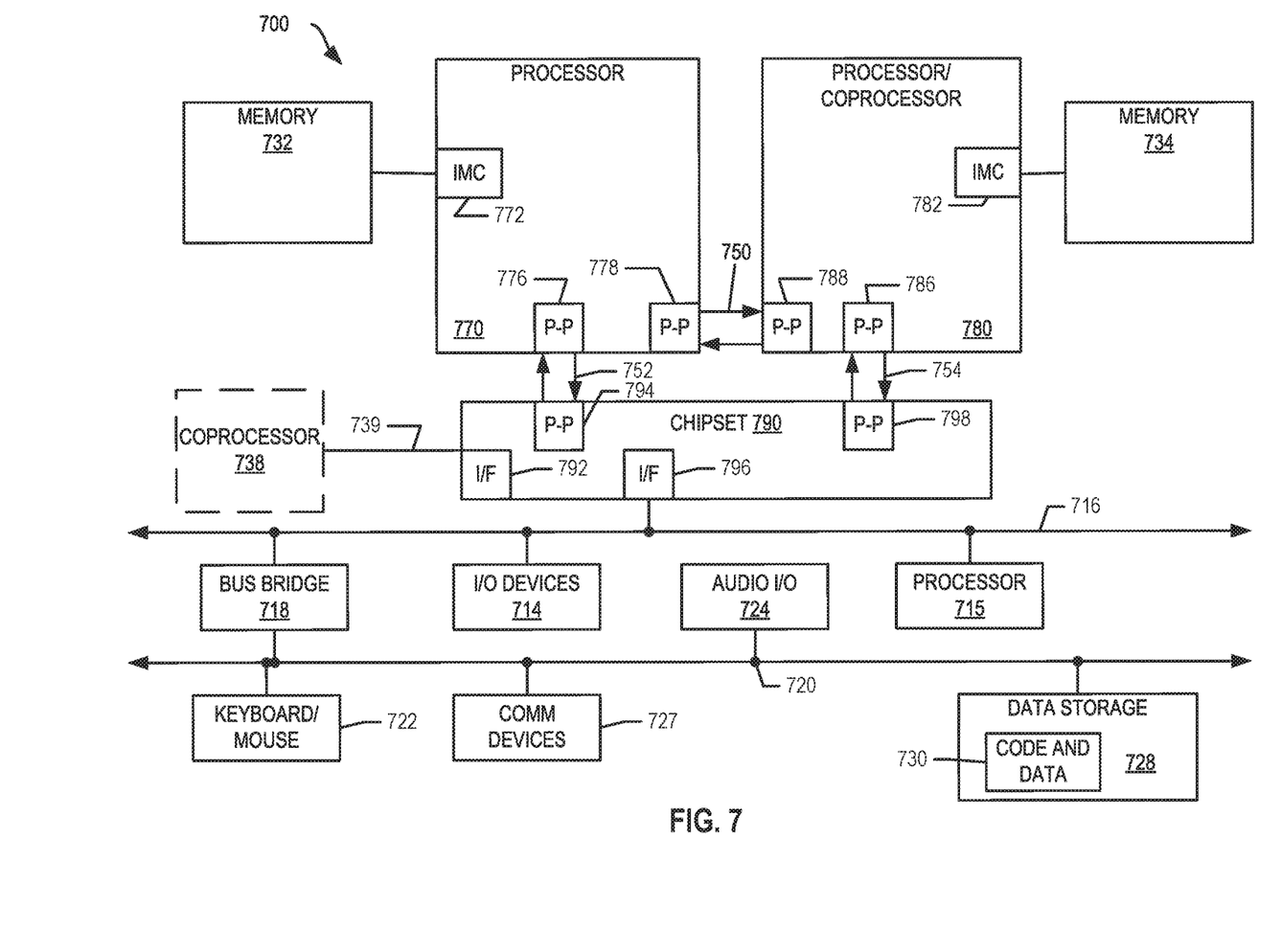
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750.

Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
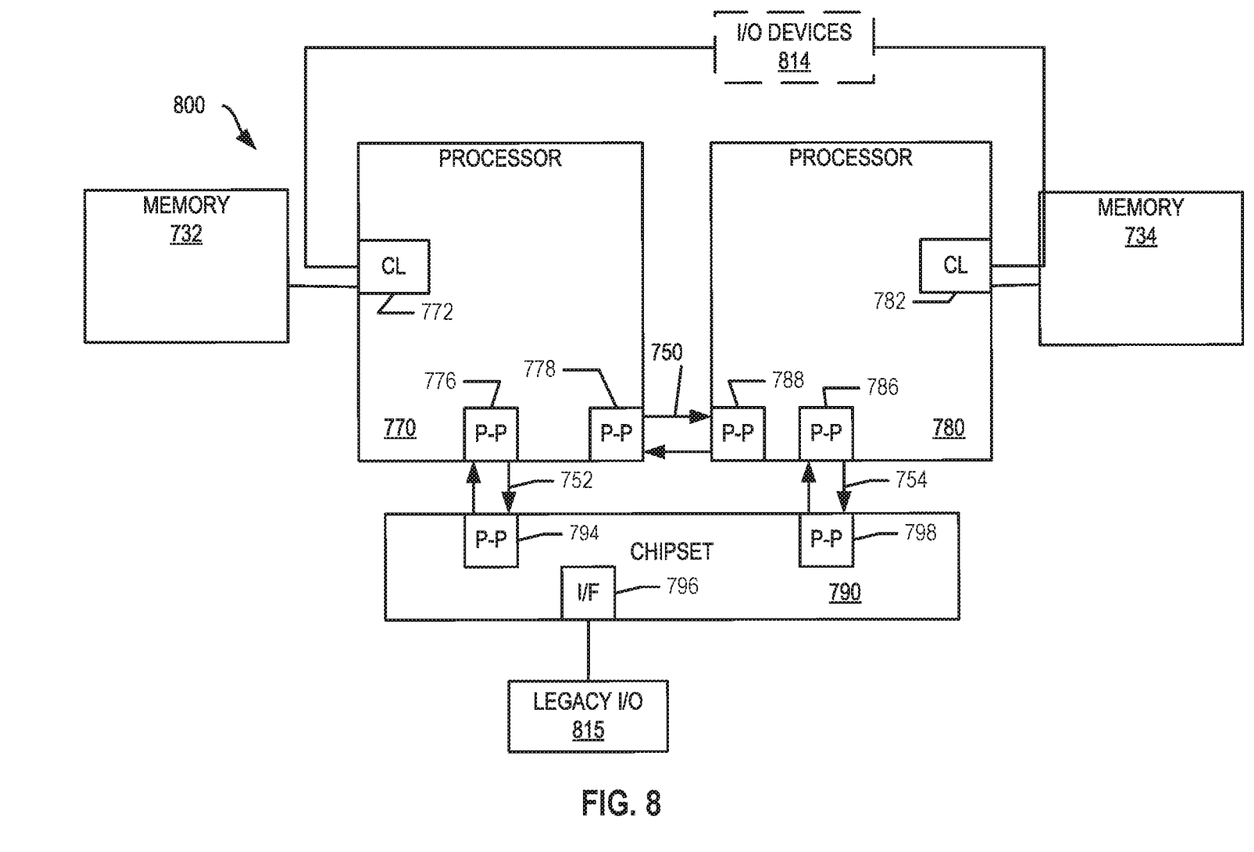
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
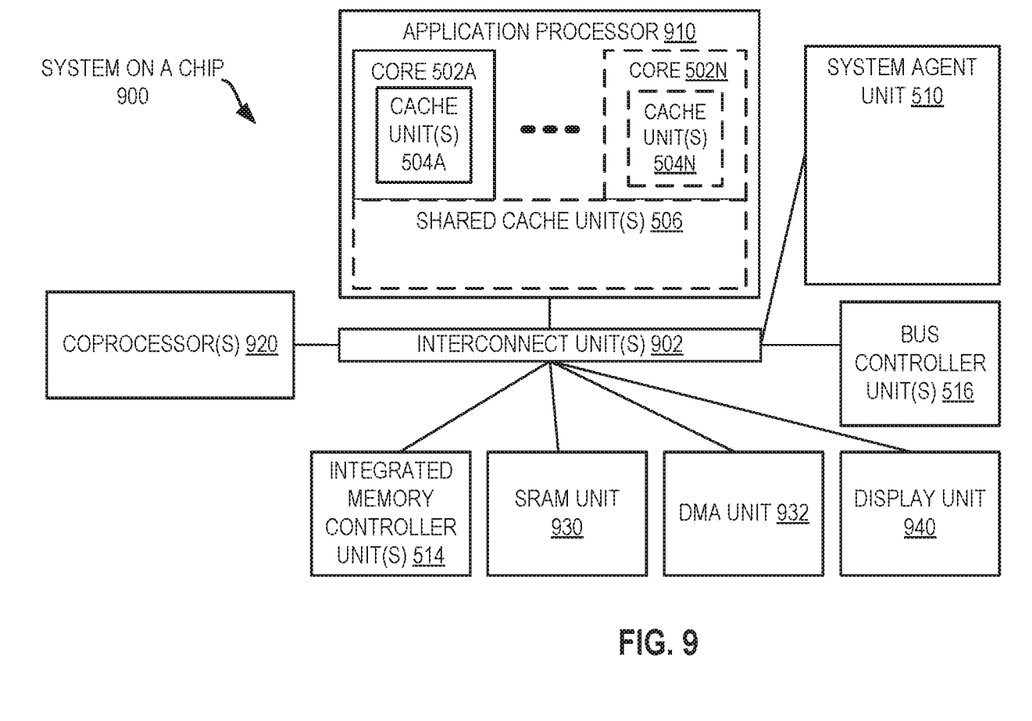
FIG. 9 is a block diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, a processor may include a plurality of execution clusters. The processor also includes a cache memory in which to store a value to be produced by a first execution cluster of the plurality of execution clusters and consumed by a second execution cluster of the plurality of execution clusters. The cache memory is separate from a system memory hierarchy and a register set of the processor.

The processor may also include a scan unit to detect that the value is to be produced by a first instruction and consumed by a second instruction; allocate an entry in the cache memory in which to store the value; and assign an identifier of the entry to the second instruction. The entry may include a first field in which to store an identifier of a register to which the value is to be assigned. The entry may also include a second field in which to store a ready indicator to indicate that the value has been produced by the first instruction and stored in the entry. The entry may also include a third field in which to store a lock indicator to indicate that the entry is locked. The processor may also include a lock manager to manage the lock indicator to prevent eviction of the entry before the value has been consumed by the second instruction. The scan unit may also be to detect that the value is to be consumed by a third instruction; find the entry in the cache memory; and assign an identifier of the entry to the third instruction. The lock manager may also be to manage the lock indicator to prevent eviction of the entry before the value has been consumed by the third instruction. The processor may also include a dependency tracker to block scheduling of the second instruction until the ready indicator is set.

In an embodiment, a method may include detecting, by scan unit of a processor, that a first instruction is to produce a value to be consumed by a second instruction; allocating an entry in a cache memory of the processor in which to store the value, the cache memory separate from a system memory hierarchy and a register set of the processor; and assigning an identifier of the entry to the second instruction. The method may also include incrementing a lock counter in response to assigning the identifier of the entry to the second instruction. The method may also include detecting, by the scan unit, that a third instruction is also to consume the value; finding the entry in the cache memory; and assigning the identifier of the entry to the third instruction. The method may also include incrementing the lock counter in response to assigning the identifier of the entry to the third instruction. The method may also include blocking, by a dependency tracker, the second instruction from being scheduled until the value has been produced by the first instruction and stored in the entry. The method may also include executing, by a first execution cluster of the processor, the first instruction; storing the value in the entry; and setting a ready indicator in the entry. The method may also include unblocking, by the dependency tracker, the second instruction in response to the ready indicator being set; executing, by a second execution cluster of the processor, the second instruction; and decrementing the lock indicator. The method may also include executing the third instruction; and decrementing the lock indicator. The method may also include determining that the lock counter equals zero; and evicting the entry from the cache.

In an embodiment, an apparatus may include means for performing any of the methods described above. In an embodiment, a machine-readable tangible medium may store instructions, which, when executed by a machine, cause the machine to perform any of the methods described above.

In an embodiment, a system may include a system memory having a hierarchy of levels and a processor including a plurality of execution clusters; a first cache memory in the hierarchy of levels of the system memory; and a second cache memory in which to store a value to be produced by a first execution cluster of the plurality of execution clusters and consumed by a second execution cluster of the plurality of execution clusters, the second cache memory separate from the first cache memory and the hierarchy of levels of the system memory hierarchy.

The system may also include a physical register file separate from the second cache memory.

What is claimed is:

1. A processor comprising:
a plurality of execution clusters;
a cache memory to store a value to be produced by a first execution cluster of the plurality of execution clusters and consumed by a second execution cluster of the plurality of execution clusters, the cache memory distinct from other storage in a system memory hierarchy and a register set of the processor; and
a scan unit to:
detect that the value is to be produced by a first instruction and consumed by a second instruction,
allocate an entry in the cache memory to store the value, the entry to include a first field to store an identifier of a register to which the value is to be assigned, and
assign an identifier of the entry to the second instruction.

2. The processor of claim 1, wherein the entry includes a second field to store a ready indicator to indicate that the value has been produced by the first instruction and stored in the entry.

3. The processor of claim 2, wherein the entry includes a third field to store a lock indicator to indicate that the entry is locked.

4. The processor of claim 3, further including a lock manager to manage the lock indicator to prevent eviction of the entry before the value has been consumed by the second instruction.

5. The processor of claim 4, wherein the scan unit is also to:
detect that the value is to be consumed by a third instruction;
find the entry in the cache memory; and
assign an identifier of the entry to the third instruction.

6. The processor of claim 5, wherein the lock manager is also to manage the lock indicator to prevent eviction of the entry before the value has been consumed by the third instruction.

7. The processor of claim 6, further comprising a dependency tracker to block scheduling of the second instruction until the ready indicator is set.

8. A method comprising:
detecting, by scan unit of a processor, that a first instruction is to produce a value to be consumed by a second instruction;
allocating an entry in a cache memory of the processor in which to store the value, the cache memory distinct from other storage in a system memory hierarchy and a register set of the processor;
assigning an identifier of the entry to the second instruction;
incrementing a lock counter in response to assigning the identifier of the entry to the second instruction;
detecting, by the scan unit, that a third instruction is also to consume the value;
finding the entry in the cache memory;
assigning the identifier of the entry to the third instruction; and
incrementing the lock counter in response to assigning the identifier of the entry to the third instruction.

9. The method of claim 8, further comprising blocking, by a dependency tracker, the second instruction from being scheduled until the value has been produced by the first instruction and stored in the entry.

10. The method of claim 9, further comprising:
executing, by a first execution cluster of the processor, the first instruction;
storing the value in the entry; and
setting a ready indicator in the entry.

11. The method of claim 10, further comprising:
unblocking, by the dependency tracker, the second instruction in response to the ready indicator being set;
executing, by a second execution cluster of the processor, the second instruction; and
decrementing the lock indicator.

12. The method of claim 11, further comprising:
executing the third instruction; and
decrementing the lock indicator.

13. The method of claim 12, further comprising:
determining that the lock counter equals zero; and
evicting the entry from the cache.

14. A system comprising:
a system memory having a hierarchy of levels;
a processor including:
a plurality of execution clusters;
a first cache memory in the hierarchy of levels of the system memory;
a second cache memory to store a value to be produced by a first execution cluster of the plurality of execution clusters and consumed by a second execution cluster of the plurality of execution clusters, the second cache memory distinct from the first cache memory and other storage in the hierarchy of levels of the system memory hierarchy; and
a scan unit to:
detect that the value is to be produced by a first instruction and consumed by a second instruction,
allocate an entry in the second cache memory to store the value, the entry to include a first field to store an identifier of a register to which the value is to be assigned, and
assign an identifier of the entry to the second instruction.

15. The system of claim 14, wherein the processor also includes a physical register file distinct from the second cache memory, the physical register file including the register.

* * * * *